United States Patent [19]

Fujikura et al.

[11] 4,244,051
[45] Jan. 6, 1981

[54] DATA COMMUNICATION METHOD AND APPARATUS THEREFOR

[75] Inventors: Nobuyuki Fujikura; Makoto Noomi, both of Kawasaki; Hirokazu Ihara, Machida, all of Japan

[73] Assignee: Hitachi, Ltd., Japan

[21] Appl. No.: 5,470

[22] Filed: Jan. 22, 1979

[30] Foreign Application Priority Data

Jan. 20, 1978 [JP] Japan .................................. 53-4357

[51] Int. Cl.$^3$ ...................... H04L 25/49; H04L 25/34
[52] U.S. Cl. ................................ 375/17; 340/347 DD
[58] Field of Search ............ 325/38 A; 178/68, 69 D; 358/262; 340/347 DD, 146.1 R; 375/17, 18, 20, 27

[56] References Cited
U.S. PATENT DOCUMENTS

| | | | |
|---|---|---|---|
| 3,339,017 | 8/1967 | Quinlan | 358/262 |
| 3,801,911 | 4/1974 | Horsten | 325/38 A |
| 4,083,005 | 4/1978 | Looschen | 325/38 A |

*Primary Examiner*—Benedict V. Safourek
*Attorney, Agent, or Firm*—Craig & Antonelli

[57] ABSTRACT

Two logical values of a 3-valued code correspond to the "1" and "0" values of a binary code. When the same binary logical value occurs in successive digits of data to be transmitted, the corresponding 3-valued logical value and a third logical value are transmitted alternately. When the different binary logical value occurs in the data alternately, the corresponding 3-valued logical values are transmitted alternately.

12 Claims, 10 Drawing Figures

DATA COMMUNICATION METHOD AND APPARATUS THEREFOR

BACKGROUND OF THE INVENTION

The present invention relates to a data communication method and an apparatus therefor and, more particularly, to the transmission of binary information.

Figure 1:
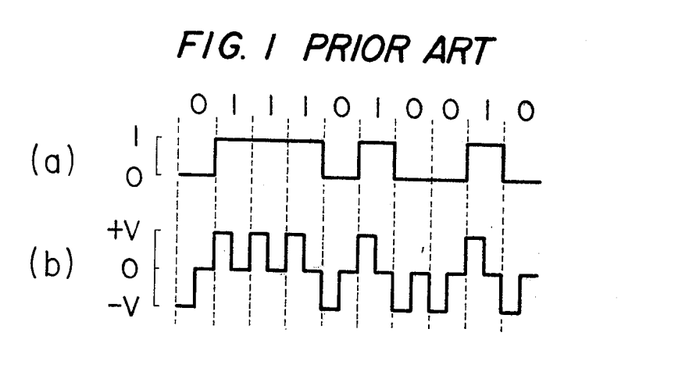
FIG. 1 is a diagram of pulses according to the polar return to zero data transmission technique found in the prior art.

One known transmission technique is the "polar return to zero" scheme. The relationship between binary data to be transmitted and its transmission waveform according to the polar return to zero method is shown in FIG. 1. In this technique, the logical values "1" and "0" of a binary code are represented by using two voltage levels, e.g. $+V$ and $-V$, respectively, as shown. Each voltage level is always returned to zero for every digit. The signal level changes digit-by-digit, so that timing pulses can be obtained from the data at a receiver. The polar return to zero method, therefore, is known as a self clocking data format. This technique is discussed, for example, in U.S. Pat. No. 3,863,025, particularly in column 1 thereof. Some of its disadvantages are also discussed in the patent. A further disadvantage of this technique is the fact that a relatively broad bandwidth is required for transmission.

SUMMARY OF THE INVENTION

An object of the present invention is to provide a novel data communication method and an apparatus therefor in which the bandwidth required for transmission is not so broad as in the polar return to zero method, while the merit of the self clocking data format is retained.

Another object of the present invention is to provide a data communication system which comprises an error detecting function suitable for the data transmission method mentioned above.

In the data transmission according to the invention, there are provided two signals having respective levels corresponding to the logical values "1" and "0" of the binary code and a third signal having a level different from the above-mentioned two levels. The data to be transmitted is coded in a 3-valued code so that, when the different logical values occur alternately in the data, the signals corresponding to the respective logical values are transmitted and, when the same logical value occurs for two or more digits of the data successively, the corresponding signal and the third signal are transmitted alternately.

Further, a 3-valued logical addition is executed with respect to all digits of the data coded in the manner described above. On the basis of a result of addition, a check code is generated and errors in the transmitted data are detected.

DETAILED DESCRIPTION OF THE PREFERRED EMBODIMENT

Figure 2:
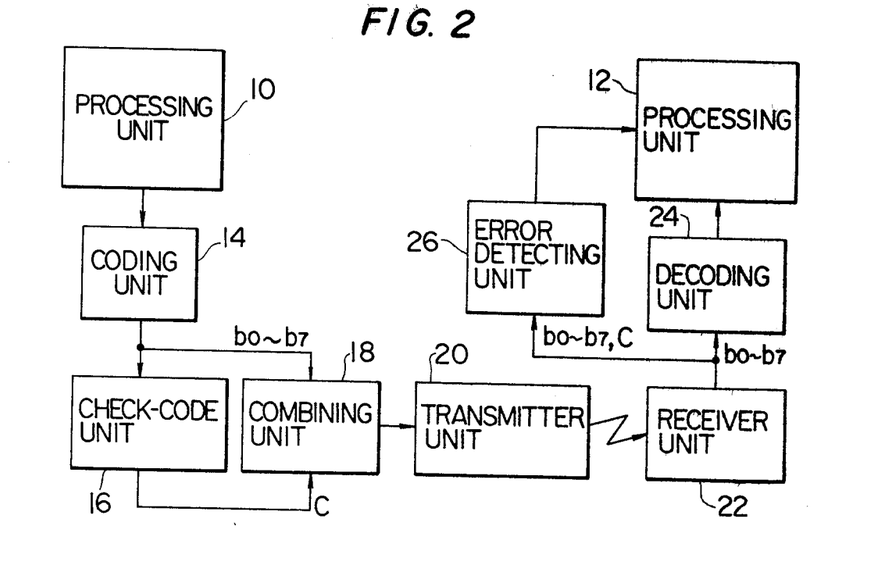
FIG. 2 is a schematic diagram showing an embodiment of the overall arrangement of a data communication system to which the present invention is applied.

Referring now to FIG. 2, the overall arrangement of an example of a data communication system to which the present invention is applied is shown schematically. In this arrangement, data is transmitted between two processing units 10 and 12. Assume that a digital data signal, which is treated in both units, is comprised of one byte or eight digits or binary bits $b_0, b_1, b_2, \ldots b_7$. The processing unit 10 belongs to the transmission end and the processing unit 12 to the receiving end.

At the transmission end, the data signal from the processing unit 10 is coupled to a coding unit 14, in which the data signal is coded from the binary code into the 3-valued code to be described below. Reference numeral 16 denotes a check-code unit, which generates a check code c for the transmission error detection on the basis of the data signal coded in the coding unit 14. Eight digits $b_0$ through $b_7$ of the coded data signal and the check code c are combined in combining unit 18 so that the check code c is positioned after the eighth digit $b_7$ by appropriate timing. The signal thus obtained is transmitted by a transmitter unit 20 through a given transmission medium.

At the receiving end, receiver unit 22 receives the transmitted signal and transfers the digits $b_0$ through $b_7$ thereof to a decoding unit 24, which decodes the coded signal from the 3-valued code into binary code for use in the processing unit 12. The received signal including the check code c is fed to an error detecting unit 26, which detects whether or not there is any error in the received signal. When an error is detected, the error detecting unit 26 produces an error detection signal and supplies it to the processing unit 12. Upon receipt of the error detection signal, the processing unit 12 initiates the appropriate operation, for example, prohibiting an erroneous signal from being used or requesting the transmitting end to retransmit the correct signal. Since, however, these operations have nothing to do with the present invention, a more detailed description thereof is omitted.

Now, the form of the signal which is handled in each element of the arrangement described above, briefly, will be discussed. Generally, the data signal is handled in parallel format in many of the usual processing units. As will be understood from the description below, the check-code unit 16 and the error detecting unit 26 also treat the signal in parallel format. On the other hand, the signal is handled in serial format in the coding unit 14 and the decoding unit 24. Therefore, a parallel-serial converter is coupled between the processing unit 10 and the coding unit 14. Between the coding unit 14 and the check-code unit 16, a serial-parallel converter is required. Also at the receiving end, a serial-parallel converter is provided between the receiver unit 22 and the error detecting unit 26 and between the decoding unit 24 and the processing unit 12. It is well known to one skilled in the art that such a converter as described above can be realized by using a known shift register. For the purpose of simplification, such converter is omitted in FIG. 2.

The operation of the arrangement of FIG. 2 will be explained, hereinafter, by reference to FIGS. 3 through 10.

CODING

In the data transmission system according to the present invention, data in the binary code is converted to a 3-valued code (a three level code or pseudo-ternary code). Three logical values of the 3-valued code are called "1," "0," and "$\phi$," and the first two are made to correspond to the logical values "1" and "0" of the binary code, respectively. The function of the third value "$\phi$" will become clear from the following description of the embodiment.

Figure 3:
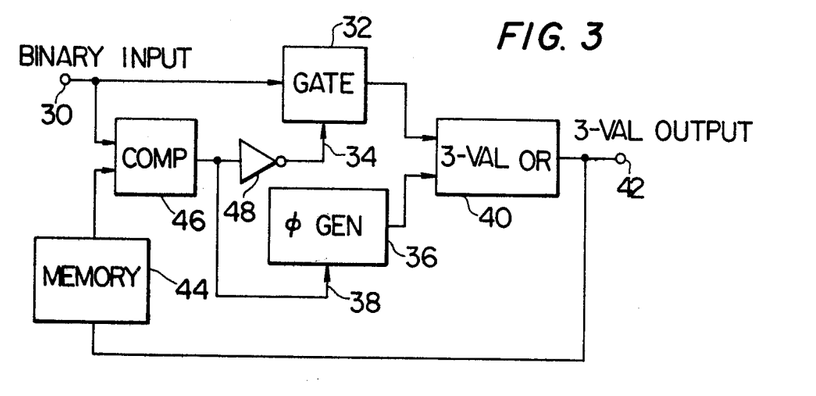
FIG. 3 shows a coding unit used in the arrangement of FIG. 2.

Referring now to FIG. 3, the coding unit 14 used in the arrangement of FIG. 2 is shown in detail. In the drawing, reference numeral 30 represents an input terminal to which the binary coded signal from the processing unit 10 is applied after parallel-serial conversion. Reference numeral 32 indicates a gate which is controlled by a gate signal 34. The signal applied at the terminal 30 passes through the gate 32 when the gate signal 34 occurs. Reference numeral 36 represents a generator which generates a pulse of the third value "$\phi$" upon receipt of a trigger signal 38 (therefore called a $\phi$ generator, hereinafter). Output signals from the gate 32 and the $\phi$ generator 36 are coupled to an output terminal 42 through a 3-valued OR circuit 40. Reference numeral 44 shows a memory which comprises tristable multivibrators. The memory 44 stores the output from the 3-valued OR circuit 40, and its content is renewed by the recurring output. Reference numeral 46 represents a comparator which compares the input signal applied to the terminal 30 with the contents of the memory 44 and produces an output when both input signals coincide with each other. The output of the comparator 46 is fed directly to the $\phi$ generator 36 as the trigger signal 38 and, through an inverter 48, to the gate 32 as gate signal 34.

Making reference to FIG. 4, explanation will now be given for the operation of the coding unit 14 described above.

Figure 4:
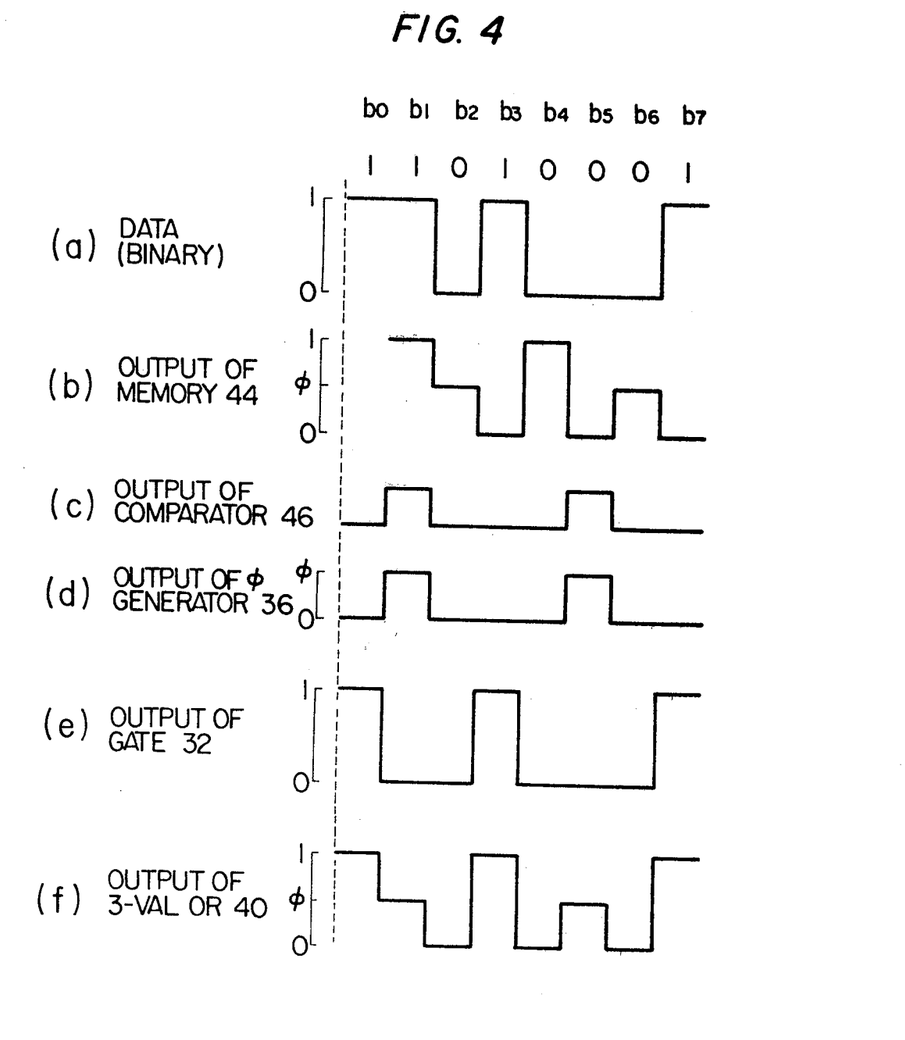
FIGS. 4 and 5 are diagrams used for explanation of the operation of the coding unit shown in FIG. 3.

Assuming that the data to be transmitted is "11010001," then the waveform of the input signal is as shown in FIG. 4(a). First of all, when "1" as digit $b_0$ is applied to the terminal 30, that "1" is transferred to the terminal 42 through the gate 32 and the 3-valued OR circuit 40 and simultaneously, "1" is stored in the memory 44.

As the second digit $b_1$, a "1" occurs. This "1" is compared with the contents of the memory 44 in the comparator 46. In the memory 44, as explained above, a "1" is already stored. The comparator 46, therefore, produces an output (see FIG. 4(c)). This output is fed to the gate 32 through the inverter 48, so that the gate 32 is disabled, whereas it is supplied directly to the $\phi$ generator 36. As a result, a "1" as digit $b_1$ is prevented from passing through the gate 32 (see FIG. 4(e)), and the $\phi$ generator 36 is triggered, to generate a pulse at the level corresponding to "$\phi$" as shown in FIG. 4(d). Accordingly, "$\phi$" appears at the terminal 42 through the 3-valued OR circuit 40 (see FIG. 4(f)). At the same time, the output of the 3-valued OR circuit 40 rewrites the contents of the memory 44 from "1" to "$\phi$." Upon application of the input signal of the third digit, i.e. "0" to the terminal 30, the output of the comparator 46 disappears, as shown in FIG. 4(c), because of the inconsistency of the input signal with the contents of the memory 44. When the output of the comparator 46 disappears, the inverter 48 produces the output, which is fed to the gate 32, so that the "0" value of digit $b_2$ passes therethrough (see FIG. 4(e) and appears at the terminal 42 through the 3-valued OR circuit 40 (see FIG. 4(f)). The contents of the memory 44 is renewed by "0." When the value "1" value of the fourth digit $b_3$ is applied to the terminal 30, as shown in FIG. 4(a), a "1" appears at the terminal 42 as shown in FIG. 4(f).

As is apparent from the above description, the output having the waveform as shown in FIG. 4(f) appears at the terminal 42, when the input as shown in FIG. 4(a) is applied to the terminal 30. Namely, when, in the data to be transmitted, the same logical value occurs in more than two digits successively, the corresponding logical value "1" or "0" of the 3-valued code and the third value "$\phi$" are transmitted alternately. When the different logical value follows alternately, the coded output changes correspondingly.

In the present explanation, the voltage level of the pulse corresponding to the logical value "$\phi$," i.e. the output of the $\phi$ generator 36, is selected between the voltage levels corresponding to the logical values "1" and "0." This voltage level can be selected otherwise; e.g. at a voltage outside the range between the voltage levels corresponding to the logical values "1" and "0." The selection of the voltage of the third level is relatively arbitrary. The data signal may be not only an electrical signal, but also a magnetic signal, a sound wave signal, a light signal, and so on. Among those, there is a medium which cannot take a negative level. In view of such a fact, the selection of the voltage of the third level may be subject to some restrictions. Further, the selection is dependent upon the field in which the data transmission is used. For example, there is, in a control instruction signal for a train, a case where, in view of fail-safe control, the emergency brake is instructed immediately when the voltage level of zero volts is detected in the instruction signal. In such a case, the voltage levels should not be so selected that each level is equal to zero volts.

Figure 5:
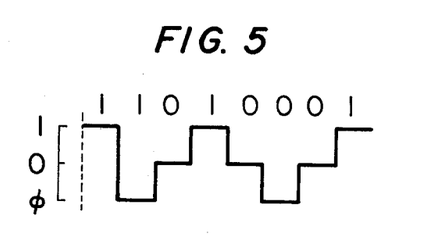

FIG. 5 shows the waveform of the same data as in FIG. 4(a); however, the three voltage levels are selected so that "1">"0">"$\phi$."

DECODING

Figure 6:
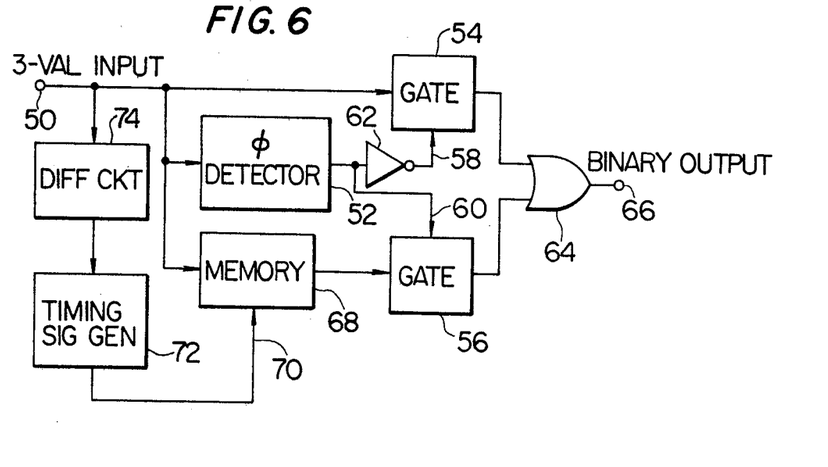
FIG. 6 shows a decoding unit used in the arrangement of FIG. 2.

Referring now to FIG. 6, an embodiment of the decoding unit 24 used in the arrangement of FIG. 2 is shown. In the Figure, reference numeral 50 indicates an input terminal to which a 3-valued input signal is applied. Reference numeral 52 represents a detector which produces an output when the input applied to the terminal 50 is "$\phi$." Reference numerals 54 and 56 represent gates, which are controlled by gate signals 58 and 60, respectively. The gate 54 is switched on by application of the signal 58, i.e. the output of an inverter 62, the input of which is supplied from the detector 52, and the gate signal 60, upon the application of which the gate 56 is turned on, is fed from the detector 52 directly. The outputs of both gates 54 and 56 are fed to an output terminal 66 through an OR circuit 64. Reference numeral 68 represents a memory which stores the input signal applied to the terminal 50. The stored contents of the memory 68 are read out digit-by-digit in response to a timing signal 70, but later by one digit time with respect to the input applied to the terminal 50. Reference numeral 72 represents a timing signal generator, the output of which becomes the timing signal 70 of the memory 68. Reference numeral 74 indicates a differential circuit which differentiates the input applied to the terminal 50, and the output of which is utilized for synchronizing the timing signal produced by the generator 72 with the timing of the input applied to the terminal 50.

Figure 7:
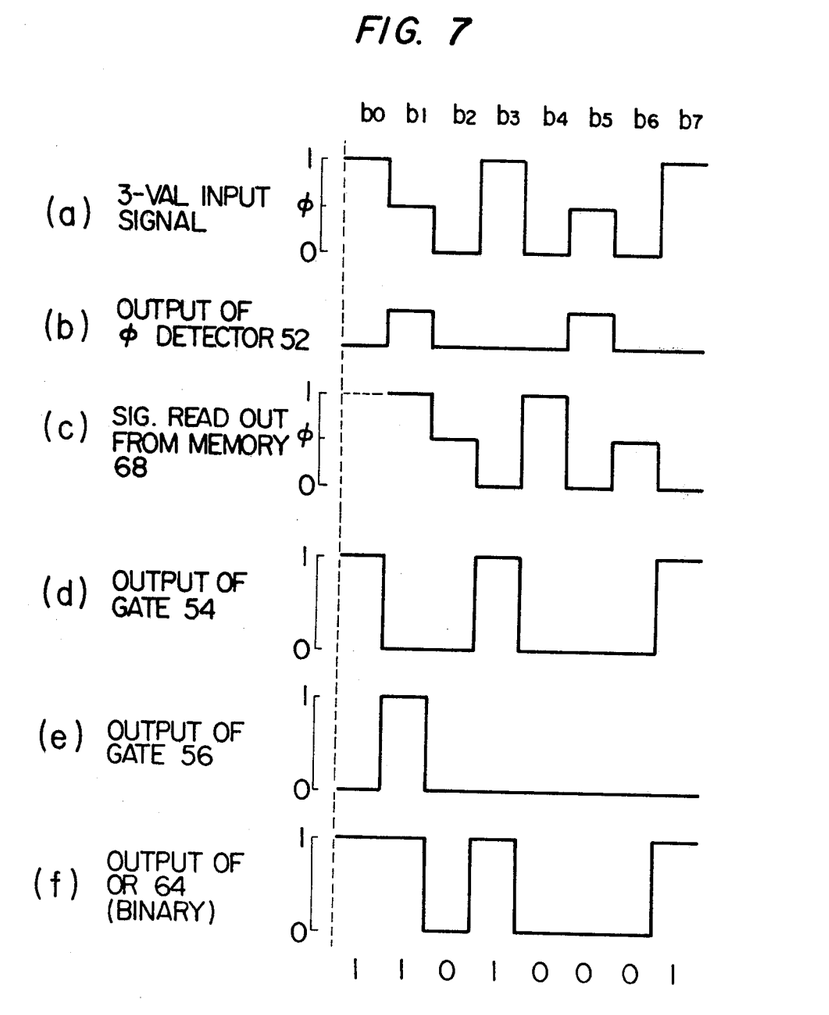
FIG. 7 is a diagram used for explaining the operation of the decoding unit shown in FIG. 6.

Referring now to FIG. 7, the operation of the decoding unit 24, described above, will be explained.

Assume that the 3-valued input signal as shown in FIG. 7(a) is applied to the terminal 50. It is to be noted that this input signal is the same as the signal shown in FIG. 4(f) as the output of the coding unit 14.

When "1" as the first digit $b_0$ is applied to the terminal 50, it passes through the gate 54 (see FIG. 7(d)) because the gate signal 58 is coupled from the inverter 62 due to no output of the detector 52 (see FIG. 7(b)). Further, the "1" as the first digit $b_0$ is stored in the memory 68. When $\phi$ as the second digit $b_1$ occurs, the detector 52 produces the output shown in FIG. 7(b). The output thereof is fed to the gate 56 and enables gate 56, whereas the gate 54 is disabled. As is shown in FIG. 7(c), the contents of the memory 68, i.e. "1," which is stored at the time of the first digit $b_0$, is read out at this time and it is renewed by "$\phi$." The signal read out from the memory 68 passes through the gate 56 and the OR circuit 64 to reach the terminal 66. This becomes the value of the digit $b_1$ of the binary code (see FIG. 7(f)). When "0" as the third digit $b_2$ appears, the detector 52 extinguishes its output, so that the gate 54 is enabled and the gate 56 is disabled. Therefore, "0" as the third digit $b_2$ reaches the terminal 66 through the gate 54 and the OR circuit 64. In the above manner, a 3-valued signal is decoded into a binary signal.

CHECK-CODE GENERATION

Figure 8:
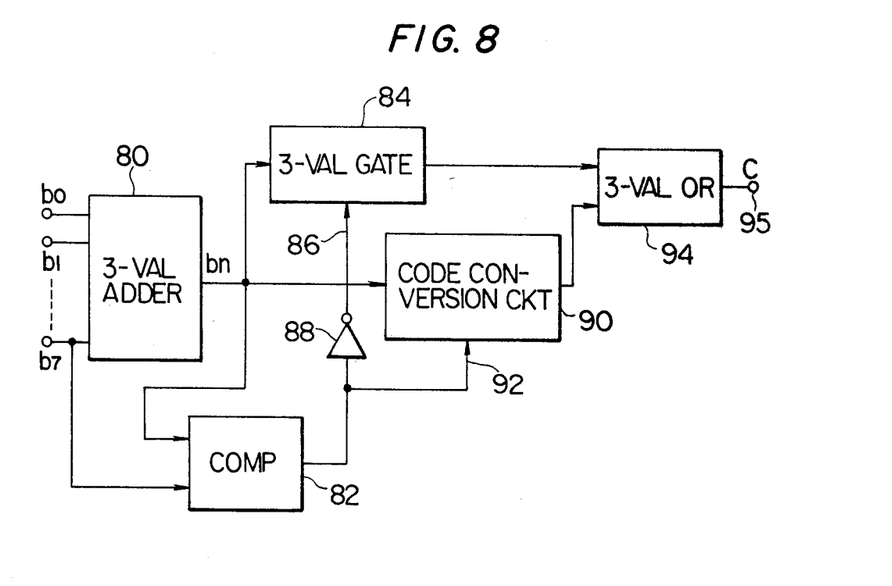
FIG. 8 shows a check-code unit used in the arrangement of FIG. 2.

FIG. 8 shows an embodiment of the check-code unit 16 used in the arrangement of FIG. 2. In the Figure, reference numeral 80 indicates a 3-valued adder with eight input terminals, to which the coded data signal of eight digits $b_0$ through $b_7$ is fed from the coding unit 14 after serial-parallel conversion. The adder 80 executes the addition of the 3-valued logic and outputs the result $b_n$ thereof. The 3-valued algebraic codes are as shown in the following TABLE 1; however, the carry is omitted:

TABLE 1

| |
|---|
| $0 + 0 = 0$ |
| $0 + \phi = \phi$ |
| $0 + 1 = 1$ |
| $\phi + \phi = 1$ |
| $\phi + 1 = \phi$ |
| $1 + 1 = 0$ |

Reference numeral 82 shows a 3-valued comparator which compares the eighth digit $b_7$ with the output $b_n$ of the adder 80 and produces an output when both inputs coincide with each other. Reference numeral 84 indicates a 3-valued gate which is controlled by a gate signal 86. The output of the comparator 82 is fed to the gate 84 as the gate signal 86 through an inverter 88. Reference numeral 90 represents a code conversion circuit, which, when a signal 92 is supplied, effects a code conversion of the input signal as follows:

TABLE 2

| Input | Output |
|---|---|
| 1 | $\phi$ |
| $\phi$ | 0 |
| 0 | 1 |

Reference numeral 94 indicates a 3-valued OR circuit, the output of which appears at a terminal 95 as a check code c. The operation of the check-code unit 16 is as follows.

When the result $b_n$ of the 3-valued addition of the digits $b_0$ through $b_7$ is different from the eighth digit $b_7$, the comparator 82 produces no output. The gate signal 86, therefore, is supplied to the gate 84 by means of the inverter 88. The output $b_n$ of the adder 80 passes through the gate 84. Accordingly, in this case, the result $b_n$ of the 3-valued addition becomes the check code.

When the result $b_n$ of the 3-valued addition coincides with the value of the eighth digit $b_7$, the comparator 82 produces an output, so that code conversion circuit 90 is activated, whereas the gate 84 is disabled. The result $b_n$ of the addition is converted by code conversion circuit 90 and the output thereof becomes the check code. Examples of these operations will be described below.

EXAMPLE 1

| | $b_0$ | $b_1$ | $b_2$ | $b_3$ | $b_4$ | $b_5$ | $b_6$ | $b_7$ |
|---|---|---|---|---|---|---|---|---|
| Data | 1 | 1 | 0 | 1 | 0 | 0 | 0 | 1 |
| Code according to the invention | 1 | $\phi$ | 0 | 1 | 0 | $\phi$ | 0 | 1 |
| Result of the 3-valued addition | | | | $b_n = 0 \ (\neq b_7)$ | | | | |

Figure 9:
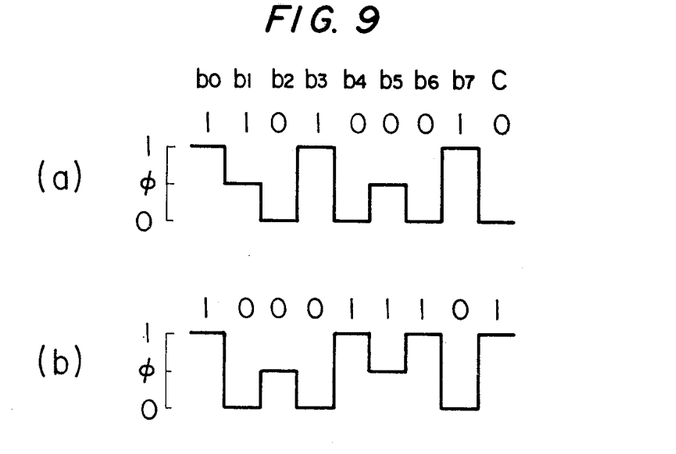
FIG. 9 is a diagram used for explaining the operation of the check-code unit shown in FIG. 8.

Accordingly, the check code c is equal to $b_n$, i.e. "0." The waveform of the digital signal including the check code becomes as shown in FIG. 9(a).

EXAMPLE 2

| | $b_0$ | $b_1$ | $b_2$ | $b_3$ | $b_4$ | $b_5$ | $b_6$ | $b_7$ |
|---|---|---|---|---|---|---|---|---|
| Data | 1 | 0 | 0 | 0 | 1 | 1 | 1 | 0 |
| Code according to the invention | 1 | 0 | $\phi$ | 0 | 1 | $\phi$ | 1 | 0 |
| Result of the 3-valued addition | | | | $b_n = 0 \ (= b_7)$ | | | | |

In this case, since the result $b_n$ is equal to the eighth digit $b_7$, the code conversion circuit 90 is activated, so that "0" of the result $b_n$ is converted to "1" (see Table 2). The check code c, therefore, becomes "1." The waveform of the digital signal including the check code c is as shown in FIG. 9(b).

ERROR CHECK

Figure 10:
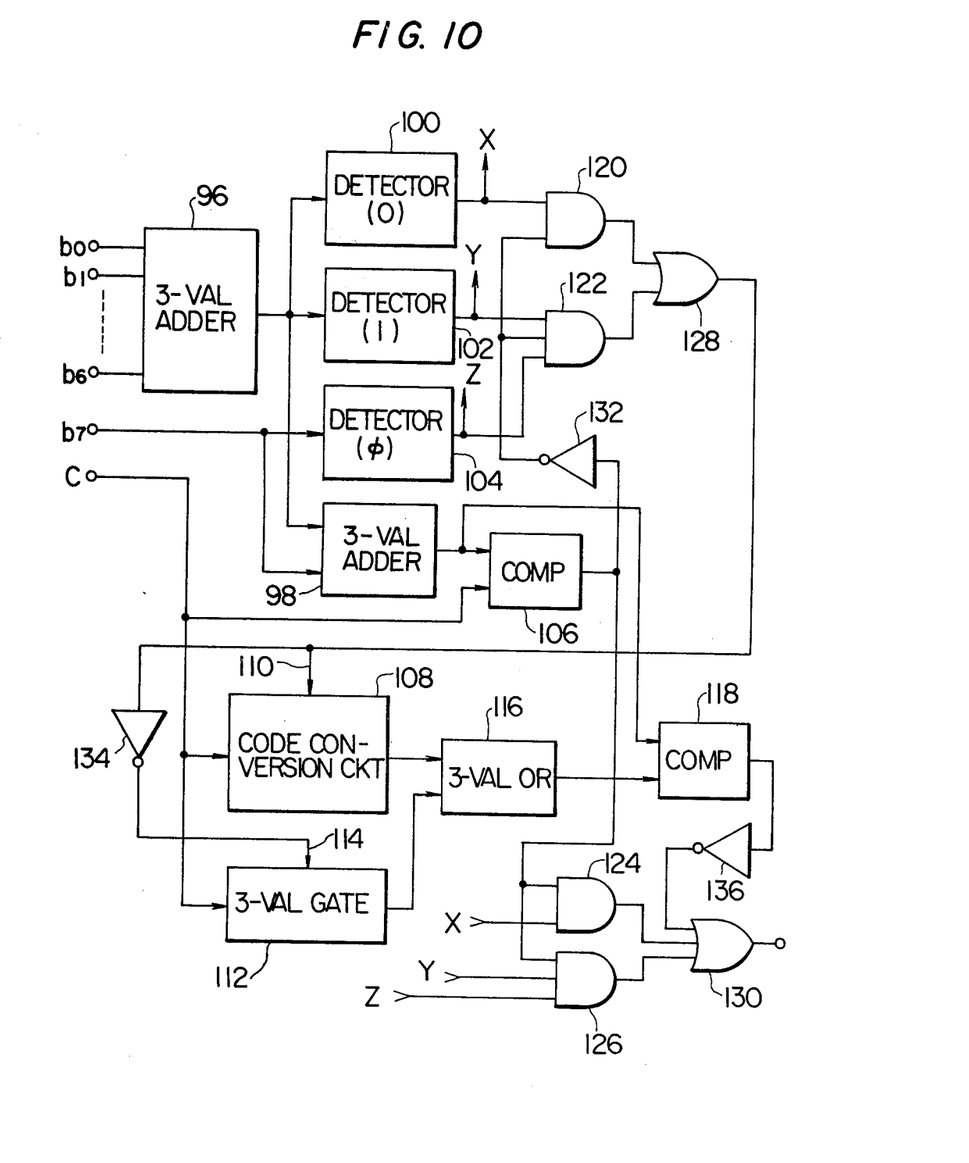
FIG. 10 shows an error detecting unit used in the arrangement of FIG. 2.

Referring now to FIG. 10, the arrangement of the error detecting unit 26 is shown. In the Figure, reference numeral 96 indicates a 3-valued adder with plural input terminals to which the output from the receiver unit 22 is applied after serial-parallel conversion. The operation thereof is the same as that of the adder 80 in FIG. 8. In the adder 96, however, addition is conducted with respect to the seven digits $b_0$ to $b_6$. Reference numeral 98 indicates a 3-valued adder having two inputs, which adds the value of the eighth digit $b_7$ to the output of the adder 96. Reference numerals 100, 102, and 104 denote detectors. The detectors 100 and 102 are both connected to the adder, and detect the values "0"

and "1" in the output of the adder 96, respectively. Detector 104 detects whether the eighth digit $b_7$ is "$\phi$." Reference numeral 106 indicates a 3-valued comparator which compares the output of the adder 96 with the check code c to produce an output upon coincidence of both inputs. Reference numeral 108 represents a code conversion circuit, which, upon application of a signal 110, effects code conversion of the input signal as follows:

TABLE 3

| Input | Output |
|-------|--------|
| 1 | 0 |
| $\phi$ | 1 |
| 0 | $\phi$ |

Reference numeral 112 shows a 3-valued gate which is controlled by a signal 114. Reference numeral 116 represents a 3-valued OR circuit to which the outputs of the code conversion circuit 108 and the gate 112 are fed. Reference numeral 118 shows a 3-valued comparator which compares the output of the adder 98 with that of the OR circuit 116 to produce an output upon coincidence of both inputs. Reference numerals 120, 122, 124, and 126 indicate AND gates, 128 and 130 OR gates, and 132, 134, and 136 inverters.

The error check operation will be explained hereinafter. The explanation will at first be made for a digital signal with no error, and then for that including an error.

(1) The digital signal contains no error

As an example of the digital signal, the signal as shown in FIG. 9(a) will be considered. In this signal, the 3-valued addition from digit $b_0$ to digit $b_7$, i.e. the output of the adder 96, is a "1." Since the eighth digit $b_7$ is also a "1," the adder 98 produces a "0" as a result of the addition. The check code c becomes "0" so that the comparator 106 produces an output. This output is inverted by the inverter 132 and fed to the AND gates 120 and 122. Accordingly, both AND gates 120 and 122 and, therefore, OR gate 128, produce no output. The inverter 134 sends its output to the 3-valued gate 112, so that the check code c, i.e. "0," passes through the gate 112 and reaches the comparator 118 as one of two inputs thereof through the 3-valued OR circuit 116. The other input of the comparator 118, i.e. the output of the adder 98, is also "0" so that the comparator 118 produces an output. This output is inverted by the inverter 136 and, therefore, the output of inverter 136 disappears. Further, AND gates 124 and 126 do not produce an output, because the inputs x and z are both off. Accordingly, no output occurs from the OR circuit 130.

Next, consider the signal as shown in FIG. 9(b). In this case, the output of the adder 96 is "0". Since the eighth digit $b_7$ is "0," the output of the adder 98 is also "0." The check code c is "1." The comparator 106, therefore, produces no output, so that inverter 132 produces an output. On the other hand, since the output of the adder 96 is "0," the detector 100 produces an output. By the presence of the outputs from the detector 100 and the inverter 132, AND gate 120 produces an output, which is fed to the code conversion circuit 108 and the inverter 134 through OR circuit 128. The code conversion circuit 108 is activated and the 3-valued gate 112 is disabled. The check code c, i.e. "1" in this case, is converted to "0" (see Table 3), which is fed to the comparator 118 as one of the two inputs thereof through the 3-valued OR circuit 116. The other input of the comparator 118 is the output of the 3-valued adder 98, which is "0," as explained above. The comparator 118 couples its output to inverter 136 and, therefore, the output of the inverter 136 disappears. As explained above, comparator 106 has no output, so that the AND gates 124 and 126 produce no output. Accordingly, there is no output from OR circuit 130.

(2) The digital signal includes an error

Assume that the check code c is "$\phi$" in the digital signal shown in FIG. 9(a), as Example 1. As already described, the result of the addition from digit $b_0$ to digit $b_6$ is "1," so that the detector 102 produces an output, but the detector 100 does not. Since the eighth digit $b_7$ is "1," the detector 104 produces no output. Accordingly, AND gates 120 and 122 and, therefore, OR circuit 128, produce no output. The 3-valued gate 112 is enabled and the check code c, i.e. "$\phi$" in this case, passes through gate 112 and the 3-valued OR circuit 116 to reach the comparator 118. On the other hand, the output of the adder 98 is "0," because the output of the adder 96 and the value of the eighth digit $b_7$ are both "1." Comparator 118 produces no output due to the inconsistency of the two inputs. The output of the inverter 136 and, therefore, the output of the OR circuit 130 appears. The occurrence of the output of the OR circuit 130 means that an error is included in the digital input signal.

As another example, assume that the eighth digit $b_7$ is "$\phi$" in the digital signal of Example 2 as shown in FIG. 9(b). In this case, the output of the adder 96 becomes "0," so that detector 100 produces an output. The output of adder 98 is "$\phi$" because the output of the adder 96 is "0" and the eighth digit $b_7$ is "$\phi$" in this case. Since the check code c is "1," comparator 106 produces no output. The output of the inverter 132 becomes "on." The output of the AND gate 120 is fed to code conversion circuit 108 and inverter 134 through the OR circuit 128. The code conversion circuit 108 is activated and the 3-valued gate 112 is disabled. The check code c, i.e. "1" is converted to "0" (see Table 3). The output "0" of the code conversion circuit 108 is fed to the comparator 118 through the 3-valued OR circuit 116. Comparator 118 produces no output, so that inverter 136 produces an output, which appears from OR circuit 130 as an error detection signal.

While we have shown and described one embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed:
1. A data communication method comprising the steps of:
   generating one of first, second and third signals selectively and at a predetermined time interval in accordance with each bit of binary coded data to be transmitted; and
   transmitting said generated signals; and
   wherein said generating step includes the steps of
   detecting first and second occurrences of coincidence, said first occurrence of coincidence corresponding to coincidence between said first signal and a signal generated in response to a bit preced- ing a present bit to be transmitted by one bit, and said second occurrence of coincidence being coincidence between said second signal and said signal generated in response to said preceding bit, generating said first and second signals in response to said present bit being a logical "1" and a logical "0," respectively, under the condition that said first and second occurrence of coincidence are not detected, respectively, and generating said third signal in response to said present bit, under the condition that said first occurrence of coincidence is detected when said present bit is a logical "1" and under the condition that said second occurrence of coincidence is detected when said present bit is a logical "0."

2. A data communication method according to claim 1, wherein said first, second and third signals have first, second and third respectively different levels.

3. A data communication method according to claim 2, wherein the level of said third signal is established between the first and the second levels.

4. A data communication method according to claim 3, wherein the level of one of the first and the second signals is positive, that of the other is negative, and the level of the third signal is zero.

5. A data communication method according to claim 2, further comprising the steps of:
 executing a 3-valued logical addition with respect to all the digits of the data;
 determining the value of a check code on the basis of the result of said addition step; and
 transmitting the check code with the predetermined timing with respect to the data to be transmitted.

6. A data communication apparatus for transmitting binary encoded data and receiving the transmission, comprising:
 first means for encoding the data from the binary code into a 3-valued code so that, when the different logical value occurs alternately in the data, corresponding ones of two of the logical values of the 3-valued code are output and, when the same logical value occurs successively in more than two digits of the data, the corresponding logical value of the 3-valued code and the third logical value thereof are output alternately;
 second means for executing a 3-valued addition with respect to all digits of the data coded in the 3-valued code;
 third means for comparing the result of said 3-valued addition with the last digit of the data coded in the 3-valued code to produce an output when both coincide with each other;
 fourth means for outputting the result of said 3-valued addition as a check code when said comparing means has no output; and
 fifth means for converting the result of said 3-valued addition in accordance with a predetermined relationship of code conversion when said comparing means produces the output, and outputting a converted signal as the check code.

7. A data communication apparatus comprising:
 first means for generating one of first, second and third signals selectively and at a predetermined time interval in accordance with each bit of binary coded data to be transmitted; and
 second means, connected to said first means, for transmitting said signals generated by said first means; and
 wherein said first means includes
 third means for detecting first and second occurrences of coincidence, said first occurrence of coincidence corresponding to coincidence between said first signal and said signal generated in response to a bit preceding a present bit by one bit, and said second occurrence of coincidence corresponding to coincidence between said second signal and said signal generated in response to said preceding bit;
 fourth means, connected to said third means, for generating said first and second signals in response to said present bit being a logical "1" and a logical "0," respectively, and under the condition that said first and second occurrences of coincidence are not detected, respectively, and
 fifth means, connected to said third means, for generating said third signal in response to said present bit, under the condition that said first occurrence of coincidence is detected, when said present bit is a logical "1" and under the condition that said second occurrence of coincidence is detected when said present bit is a logical "0."

8. A data communication apparatus according to claim 7, wherein said first, second and third signals have first, second and third respectively different levels.

9. A data communication apparatus according to claim 8, wherein the level of said third signal is established between the first and the second levels.

10. A data communication apparatus according to claim 9, wherein the level of one of the first and second signals is positive, and that of the other is negative, and the level of the third signal is zero.

11. A data communication apparatus according to one of claims 8 to 10 wherein each bit of a logical "1" of said binary coded data has the same level as the level of said first signal and each bit of a logical "0" of said binary coded data has the same level as the level of said second signal.

12. A data communication apparatus according to claim 11, wherein said third means comprises:
 sixth means for storing one of said first, second and third signals generated by said fourth and fifth means in response to said preceding bit, and
 seventh means for comparing said one of said signals stored in said sixth means with said present bit to be transmitted; and wherein
 said fourth means comprises
 eighth means for gating said present bit in such a manner that said present bit is allowed to pass therethrough when coincidence is not detected by said seventh means.

* * * * *